No. 880,753. PATENTED MAR. 3, 1908.
G. & W. J. H. PAYNE.
IMITATION MARBLE AND GRANITE.
APPLICATION FILED NOV. 1, 1907.
Fig: 1.
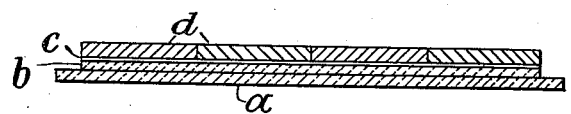
Fig: 2
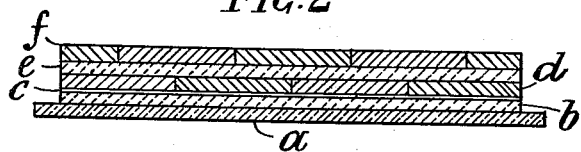
Fig: 3
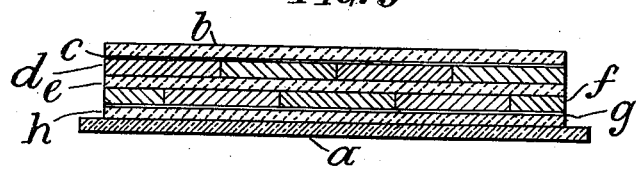
Fig: 4
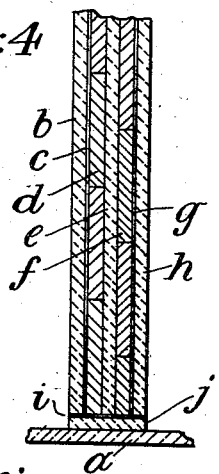
Fig: 5
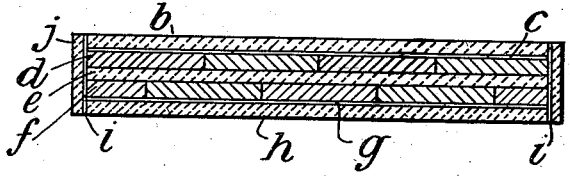
Witnesses:
E. C. Smith
R. F. Tunnell
Inventors
George Payne and
William John Howell Payne
By Knight Bros.
Attys.

UNITED STATES PATENT OFFICE.

GEORGE PAYNE, OF LONDON, ENGLAND, AND WILLIAM J. H. PAYNE, OF SAN FRANCISCO, CALIFORNIA.

IMITATION MARBLE AND GRANITE.

No. 880,753.     Specification of Letters Patent.     Patented March 3, 1908.

Application filed November 1, 1907. Serial No. 400,310.

*To all whom it may concern:*

Be it known that we, GEORGE PAYNE and WILLIAM JOHN HURRELL PAYNE, subjects of the King of Great Britain, residing, respectively, at London, England, and San Francisco, California, United States of America, have invented new and useful Improvements in Imitation Marble and Granite, of which the following is a specification.

The object of the present invention is to produce imitation marble or granite blocks having a polished and ornamental surface made of petrefite or other similar magnesite cement. The cement may be in the form of a thin coating on a suitable backing, such as slate, wood, sheet metal, cardboard or bricks, or it may be solid in the form of tiles.

The magnesite or other similar cement is placed on a very smooth or polished surface, such as smooth or polished glass, and pressed into close contact with the same. The backing, when such is used, is then pressed against the cement before this latter has set and adheres to the cement. When the cement has set it is removed from the glass by slightly twisting the cement and backing with relation to the smooth surface, thereby allowing air to enter between the two surfaces. It will be found that the magnesite cement has acquired a beautiful hard polished surface. In some cases I may form tiles, bricks or building blocks, of solid magnesite cement by forming them in molds having one or more highly polished surfaces. When desired I may apply suitable colors to the back of the cement before placing the backing, when such is used, in contact with the cement. By these means various effects may be obtained, some representing marble or granite, as the coloring matter passes into the cement and is seen through the polished surface thereof.

The invention is illustrated in the accompanying drawings, in which

Figure 1 is a sectional elevation showing the first stage of the process of making a block of imitation marble or granite. Fig. 2 is a sectional elevation showing a second stage in the same process, and Fig. 3 is an end elevation showing a third stage in the process. Fig. 4 shows a fourth stage in the process. Fig. 5 is a sectional elevation of a finished block.

In constructing a block of imitation marble, the cement, $b$, is spread by suitable means on a polished or smooth sheet of glass $a$, and suitable color, $c$, is applied to the upper surface or back of the cement $b$. The slates or other suitable sheets of material, $d$, are pressed upon the color $c$, which, when the block is removed from the glass, is seen through the polished surface of the cement. The above steps are represented at Fig. 1. It will be understood that suitable coloring matters are chosen to represent different marbles or granite, which matters are well known to those engaged in the art of producing imitation marble. A second layer of magnesite cement, $e$, see Fig. 2, is then placed on the back of the slates or other suitable sheets $d$, after which a second set of slates or other suitable sheets, $f$, is placed on the back of the cement $e$, which sheets break joint with their first set $d$, and they are firmly pressed onto the same. The whole mass is allowed to set and is then removed from the glass $a$ by twisting it in relation to the glass, thereby allowing air to enter between the glass and cement $b$. Another layer of magnesite cement, $h$, see Fig. 3, is then placed on the polished or smooth glass $a$, and coloring matter $g$ is placed on the cement $h$, after which the block shown in Fig. 2 is turned over and is pressed firmly on the coloring matter $g$.

When the block shown in Fig. 3 has set, it is removed from the glass $a$ in the manner hereinbefore described and another layer, $j$, of magnesite cement is spread on the glass $a$ and coloring matter, $i$, is placed thereon. The block shown in Fig. 3 is then placed on its edge on the coloring matter $i$ until the cement $j$ has set. The other three edges of the block are subsequently produced in the same manner.

The finished block is shown in section at Fig. 5. It has a polished surface and the appearance of imitation marble on all its sides.

What we claim as our invention is:—

1. The process of producing artificial marble and the like, which consists in, (1), spreading a layer of magnesite cement on a sheet of smooth glass, (2), placing coloring matter on the magnesite cement, and (3), pressing backing sheets of suitable material onto the coloring matter.

2. The process of producing artificial marble and the like, which consists in, (1), spreading a layer of magnesite cement on a sheet of smooth glass, (2), placing coloring matter on the magnesite cement, (3), pressing backing sheets of suitable material onto the coloring matter, (4), spreading a layer of cement on the back of the backing sheets, (5), pressing a second set of backing sheets of suitable material onto the last mentioned layer of cement and allowing same to set, (6), spreading another layer of magnesite cement onto glass, (7), placing coloring matter onto same, and (8), pressing the block made by steps 1 to 5 of this process onto the last mentioned coloring matter.

3. In an imitation block of marble, the combination of a layer of magnesite cement, a layer of coloring matter, a layer of backing sheets of suitable material, a second layer of cement, a second layer of backing sheets of suitable material, a second layer of coloring matter, and another layer of magnesite cement, all adhering together in the order named.

4. In an imitation block of marble, the combination of a layer of magnesite cement, a layer of coloring matter, a layer of backing sheets of suitable material, a second layer of cement, a second layer of backing sheets of suitable material, a second layer of coloring matter, another layer of magnesite cement, all adhering together in the order named, a layer of coloring material around the edges of the before mentioned layers, and an outer layer of magnesite cement around the last mentioned layer of coloring matter.

In witness whereof we have hereunto set our hands in presence of two witnesses.

GEORGE PAYNE.
WILLIAM J. H. PAYNE.

Witnesses to signature of George Payne:
 WM. GIRLING,
 CHAS. WALTER.

Witnesses to signature of W. J. H. Payne:
 J. P. ORMOND,
 D. B. RICHARDS.